US010517139B2

(12) United States Patent
Adams et al.

(10) Patent No.: US 10,517,139 B2
(45) Date of Patent: Dec. 24, 2019

(54) SYSTEMS AND METHODS FOR INTELLIGENT EVENT RESPONSE

(71) Applicant: STRAX Technologies, LLC, Boca Raton, FL (US)

(72) Inventors: Scott H. Adams, Boca Raton, FL (US); James Chin, Boca Raton, FL (US); Heath Glass, Boca Raton, FL (US)

(73) Assignee: STRAX Technologies, LLC, Boca Raton, FL (US)

( * ) Notice: Subject to any disclaimer, the term of this patent is extended or adjusted under 35 U.S.C. 154(b) by 0 days.

(21) Appl. No.: 15/067,667

(22) Filed: Mar. 11, 2016

(65) Prior Publication Data
US 2016/0270126 A1 Sep. 15, 2016

Related U.S. Application Data

(60) Provisional application No. 62/132,547, filed on Mar. 13, 2015, provisional application No. 62/137,717, filed on Mar. 24, 2015.

(51) Int. Cl.
*H04W 92/18* (2009.01)
*H04W 76/50* (2018.01)
(Continued)

(52) U.S. Cl.
CPC .......... *H04W 76/50* (2018.02); *H04W 4/021* (2013.01); *H04W 4/027* (2013.01); *H04W 4/90* (2018.02)

(58) Field of Classification Search
CPC ... H04W 4/021; H04W 76/007; H04W 4/206; H04W 4/04; H04W 4/06; H04W 4/08;
(Continued)

(56) References Cited

U.S. PATENT DOCUMENTS

| 8,948,732 | B1 * | 2/2015 | Negahban | ............... | H04W 4/22 455/414.1 |
| 2006/0009234 | A1 * | 1/2006 | Freer | ...................... | H04W 4/02 455/456.1 |

(Continued)

OTHER PUBLICATIONS

PCT International Search Report and Written Opinion issued in International Application No. PCT/US2016/021944 dated May 11, 2016.

*Primary Examiner* — Quan M Hua
(74) *Attorney, Agent, or Firm* — Greenberg Traurig, LLP; Chinh H. Pham; Todd C. Basile

(57) ABSTRACT

A system for coordinating a response comprising a plurality of mobile devices for use by persons responding to an event; a mobile application configured to send, via the corresponding mobile device, information concerning a response to the event of the person using the corresponding mobile device; and a server configured to receive and share the information with each of the other mobile devices so as to provide continuously updated information concerning the response of each person to the event for use in coordinating a collective response to the event by the persons. A method for coordinating a response comprising sending, via a plurality of mobile devices, information concerning a response to the event by a corresponding user of the corresponding mobile device; sharing the information with each of the other mobile devices; and displaying the shared information for facilitating coordination of a collective response to the event by the persons.

31 Claims, 15 Drawing Sheets

(51) Int. Cl.
*H04W 4/021* (2018.01)
*H04W 4/02* (2018.01)
*H04W 4/90* (2018.01)

(58) Field of Classification Search
CPC . H04W 84/12; H04W 92/18; H04W 36/0009;
H04W 4/023; H04W 4/70; H04W 76/40;
H04W 88/02; H04L 67/1044; H04L
67/1046; H04L 67/1051; H04L 63/104;
H04L 67/104
See application file for complete search history.

(56) References Cited

U.S. PATENT DOCUMENTS

| | | | |
|---|---|---|---|
| 2011/0111748 A1* | 5/2011 | Choi | H04M 1/7253 455/422.1 |
| 2012/0050101 A1 | 3/2012 | Whiteman | |
| 2012/0295576 A1* | 11/2012 | Peterson | G08G 1/205 455/404.2 |
| 2014/0087697 A1* | 3/2014 | Johnston | H04W 4/12 455/412.1 |
| 2014/0213186 A1* | 7/2014 | Gage | H04W 4/023 455/41.2 |
| 2015/0065082 A1 | 3/2015 | Sehgal | |

\* cited by examiner

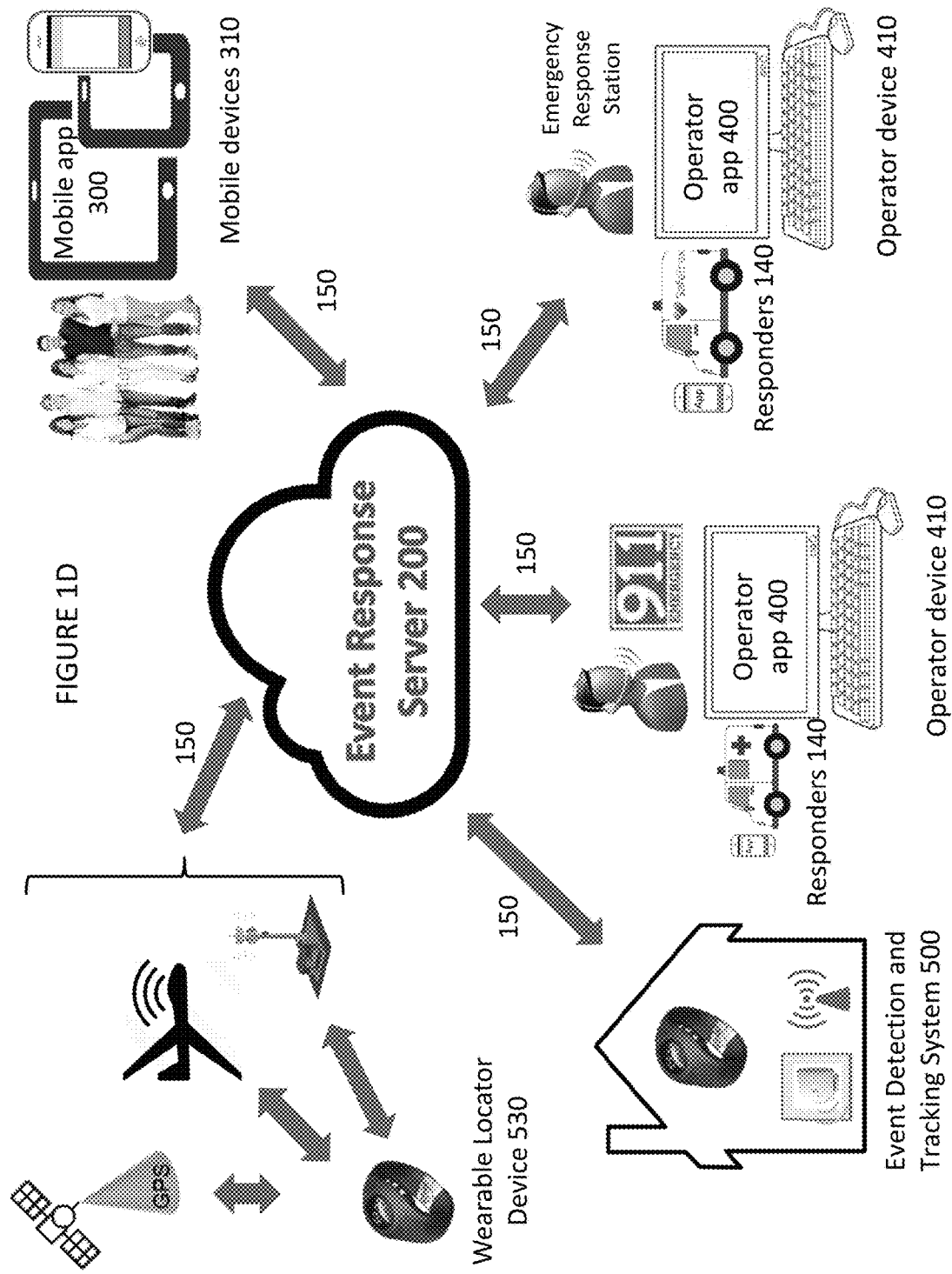

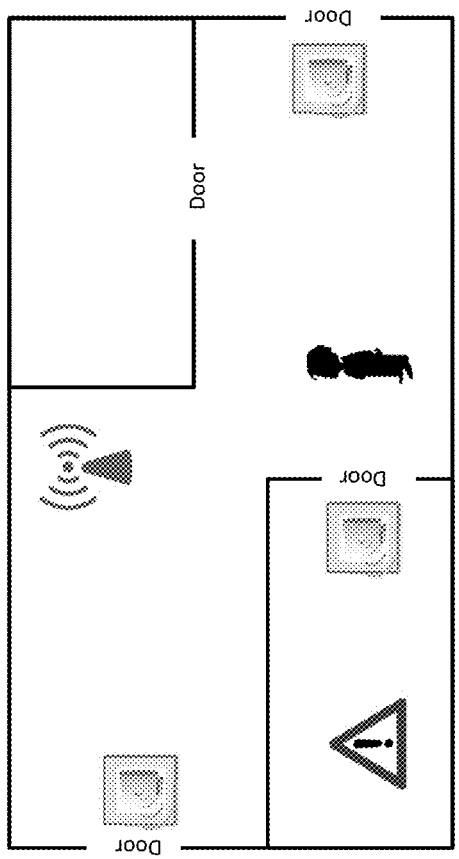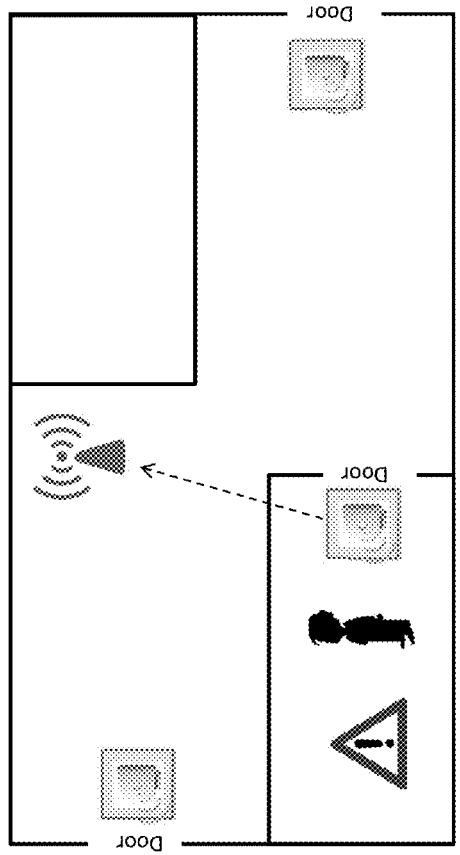

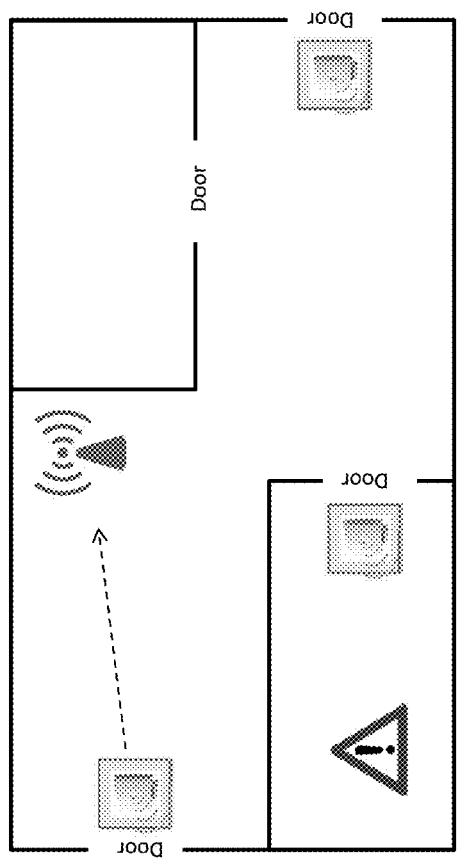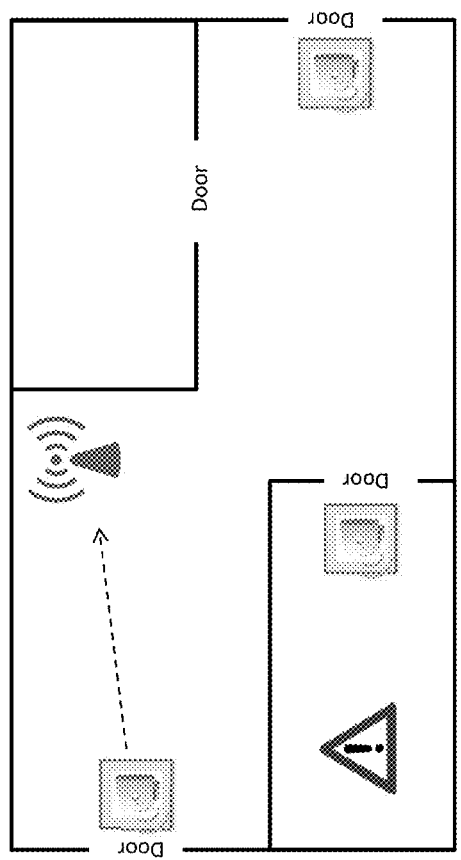

SYSTEMS AND METHODS FOR INTELLIGENT EVENT RESPONSE

RELATED U.S. APPLICATIONS

This application claims priority to U.S. Provisional Patent Application Ser. No. 62/132,547, filed Mar. 13, 2015, and U.S. Provisional Patent Application Ser. No. 62/137,717, filed Mar. 24, 2015, each of which is hereby incorporated herein by reference in its entirety for all purposes.

TECHNICAL FIELD

The present invention relates to systems and methods for coordinating and providing situational awareness to parties responding to an event involving a potential threat to the personal safety of a target subject.

BACKGROUND

Existing solutions for detecting and responding to situations in which a person or pet has wandered off, gone missing, or entered a hazardous area, suffer from a number of disadvantages. Often, family members or other caregivers must constantly monitor susceptible persons, which can be time-consuming, stressful, and ultimately result in less autonomy for all parties involved. Further, if one of these situations occur, finding and recovering the person or pet can be difficult, especially if a considerable amount of time passes before the situation is detected. Still further, it efforts to notify, coordinate, and share relevant up-to-date information with other parties during the response can be very inefficient and chaotic.

In light of these issues, it would be desirable to provide a system that electronically detects events, and manages the flow of information amongst responding parties so as to enhance situational awareness of the responding parties during the response.

SUMMARY OF THE INVENTION

The present disclosure is directed to a system for coordinating a response to an event. The system may comprise a plurality of mobile devices (e.g., a smart phone, tablet) for use by persons responding to the event, as well as a mobile application and a server. The mobile application may run on the plurality of mobile devices and be configured to send, via the corresponding mobile device, information concerning a response to the event of the person using the corresponding mobile device. The server may be configured to receive the information sent by the plurality of mobile devices, and share the information with each of the other mobile devices, so as to provide to the plurality of mobile devices, continuously updated information concerning the response of each person to the event for use in coordinating a collective response to the event by the persons.

The mobile application, in various embodiments, may send information concerning at least one of a location of the mobile device, a direction of movement of the mobile device, a speed of movement of the mobile device, and an on-duty status of the person using the mobile device. In an embodiment, the mobile application may be configured to shown on a map at least one of a location, vector, and speed of the other mobile devices, for providing the person with situational awareness regarding the locations and movements of the other persons using the other mobile devices.

The server, in an embodiment, may include a device communications module for managing the flow of the information between the mobile devices. In another embodiment, the server may include a coordinator module for executing predetermined logic defining a workflow for the event response.

The system, in various embodiments, may further include an operator application for running on an operator device. The operator application may be configured to display at least some of the information concerning the event on the operator device for providing an operator with situational awareness during the event response.

The system, in various embodiments, may further include one or more sensors for detecting activity associated with the event occurring. In an embodiment, the one or more sensors, or a base station in communication with the one or more sensors, may be configured to notify the server of a detection of the activity associated with the event occurring.

The system, in various embodiments, may further include a wearable locator device for wearing by a target of the event response. The wearable locator device being configured to provide information concerning its location to the server.

In another aspect, the present disclosure is directed to a method for coordinating a response to an event. The method may comprise providing a plurality of mobile devices (e.g., smart phone, tablet) for use by persons responding to the event. Information concerning a response to the event by a corresponding user of a corresponding mobile device may be sent from the corresponding mobile device. The information sent by the plurality of mobile devices may be shared with each of the other mobile devices. The mobile devices may display the shared information concerning the response of the other persons for facilitating coordination of a collective response to the event by the persons.

The information sent, in various embodiments, may include at least one of a location of the mobile device, a direction of movement of the mobile device, a speed of movement of the mobile device, and an on-duty status of the person using the mobile device.

The information, in an embodiment, may be send directly or indirectly to a remote server. The server may then direct the information received from the mobile devices to each of the other mobile devices.

Displaying the shared information, in an embodiment, may include displaying at least one of a location, vector, and speed of the other mobile devices is displayed on a map, for providing the person with situational awareness regarding the locations and movements of the other persons using the other mobile devices.

The method, in an embodiment, may further include the step of sharing the information with an operator at a public safety answering point or private response company for assisting the operator in coordinating the collective response to the event by the persons. In various embodiments, the method may further include detecting, via one or more sensors, activity associated with the event occurring. The mobile devices, in an embodiment, may be notified, directly or indirectly through an intermediary device, of the detection of activity associated with the event occurring. In yet another embodiment, the method may further include sending, via a wearable locator device configured to be worn by a target of the event response, information concerning at least one of a location, vector, and speed of the target.

BRIEF DESCRIPTION OF DRAWINGS

For a more complete understanding of this disclosure, reference is now made to the following description, taken in conjunction with the accompanying drawings, in which:

FIG. 1D schematically depicts a system for coordinating parties in responding to an event that utilizes an event detection and tracking system, in accordance with one embodiment of the present disclosure;

FIGS. 6A-6D schematically depict potential configurations an event detection and tracking system in a walled structure, in accordance with one embodiment of the present disclosure;

DESCRIPTION OF SPECIFIC EMBODIMENTS

Figure 1A:
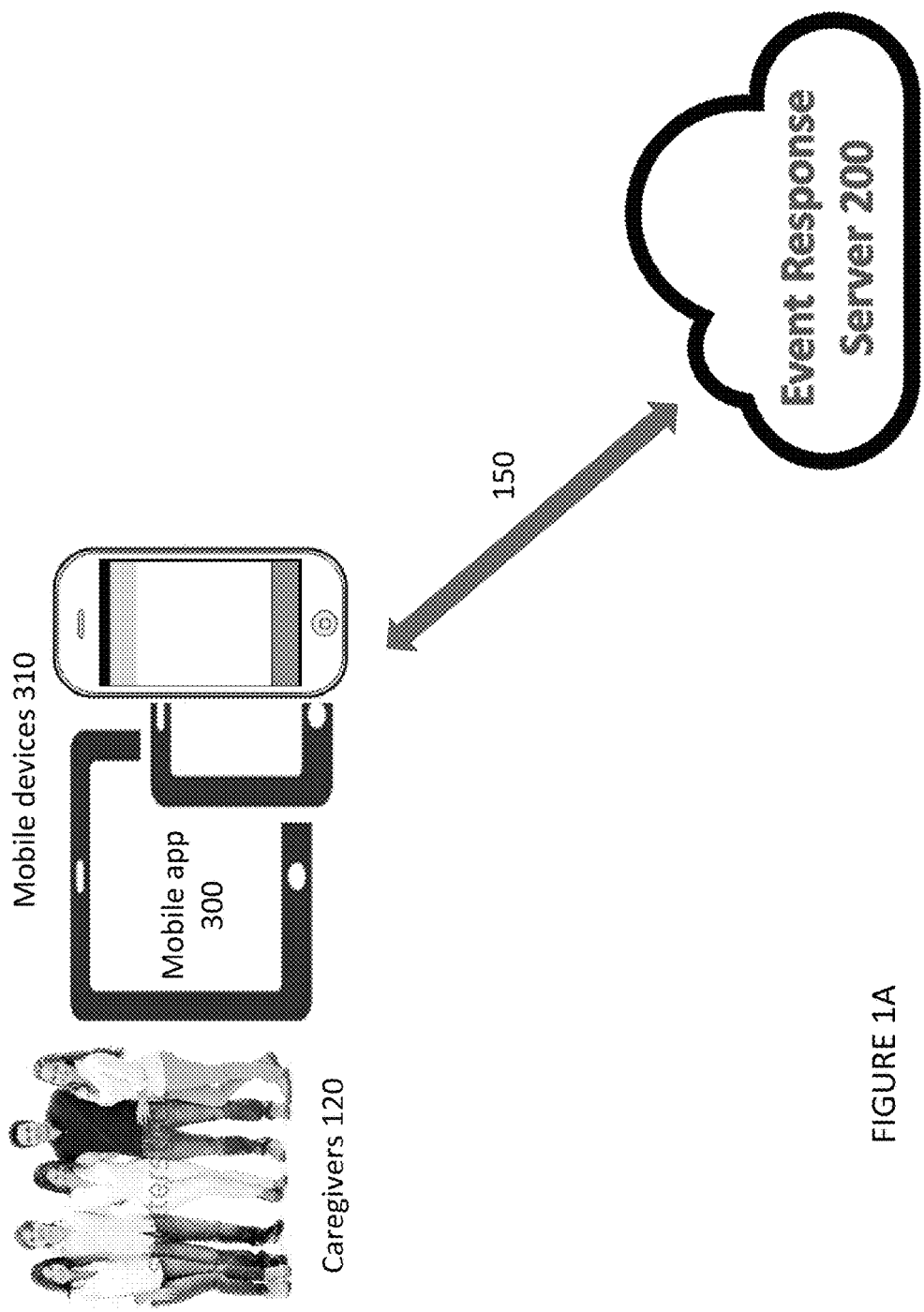
FIG. 1A schematically depicts a system for coordinating caregivers in responding to an event, in accordance with one embodiment of the present disclosure.

Embodiments of the present disclosure generally provide systems and methods for coordinating a response to an event. As used in the present disclosure, the term event is intended to broadly encompass any number of situations in which it appears a subject (e.g., person, pet) may be in danger and possibly needs assistance from other persons. Illustrative examples of such events include, without limitation, situations in which a person is lost, missing, or in a dangerous environment. The term event may also broadly encompass situations in which the subject is not necessarily in danger, but needs to be contacted or apprehended by one or more persons. Illustrative examples of such events include, without limitation, law enforcement suspects that may be in the act of committing a crime or fleeing a crime scene.

While not intended to be limited as such, systems and methods of the present disclosure may be described in the context of detecting and responding to an event involving a child, elderly person (possibly suffering from cognitive ailment such as Alzheimer's or autism), or pet that has wandered off, gone missing, or entered an area known to have hazards, such as a chemical storage closet or area containing water hazards such as a swimming pool, river or lake. A response, as used in the present disclosure, is intended to broadly encompass actions taken by one or more persons to located and/or recover the subject of the event. While not intended to be limited as such, systems and methods of the present disclosure may be described in the context of coordinating family members, caregivers, public or private responders, search parties, or other groups of people and/or assets (e.g., vehicles, sensors) in locating and recovering the subject from the potentially dangerous situation.

Notwithstanding the illustrative examples described above, one of ordinary skill in the art will recognize any number of situations within the scope of the present disclosure that may be understood as events to which the systems and methods described herein may be used in facilitating a coordinated response.

In various embodiments, systems and methods of the present disclosure may have consumer applications in homes, assisted living centers, schools, and other environments having children, elderly persons, pets or others that may be prone to wandering off or being injured by attractive nuisances such as swimming pools, household chemicals, etc. In such applications, systems and methods of the present disclosure may be used by caregivers 120 or other persons responsible for the safety and well-being of a particular target 110 to detect and/or respond to such events. As used in the present disclosure, the term caregiver is intended to broadly encompass any number of persons identified as a designated contact to notify should an event occur. Illustrative examples include, without limitation, family members, friends, care nurses, assisted-living home personnel, and any other similar parties. In some real-world applications, embodiments of the present disclosure may allow at-risk targets 110 and their caretakers 120 to maintain greater autonomy and flexibility in their daily lives by providing a reliable way to detect and coordinate responses to events that may otherwise require the target 110 to be placed under closer supervision.

Referring now to FIGS. 1A-1D, illustrated are various embodiments of event response system 100 of the present disclosure. Event response system 100 may generally include an event response server 200, an event response mobile application 300, and one or more communication links 150 therebetween, as shown in FIG. 1A and later described in more detail. Mobile application 300 may be installed and run on one or more mobile devices 310, such as a smart phone, tablet, or other suitable device. In various embodiments, caregivers 120 may utilize mobile application 300 to transmit, receive, and/or process real-time information related to the event and associated response while searching for the target 110.

Figure 1B:
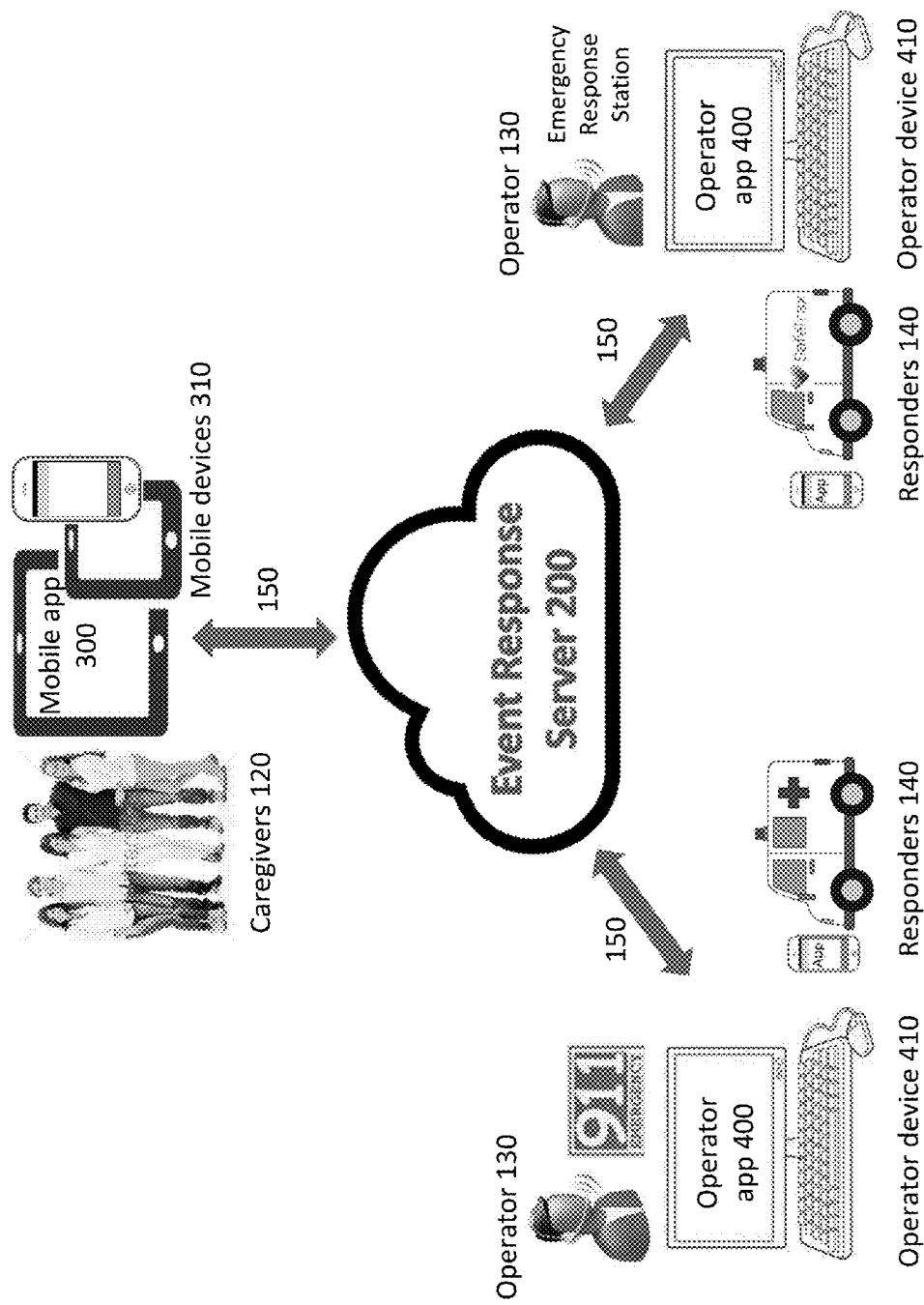
FIG. 1B schematically depicts a system for coordinating caregivers and public/private responders in responding to an event, in accordance with one embodiment of the present disclosure.

Referring now to FIG. 1B, event response system 100 in various embodiments may further include one or more communication links 150 for sharing information regarding the event and associated response with operators 130 at public safety answering points (PSAPs) and/or private emergency response service providers. In some embodiments, caregivers 120 may choose to escalate response to the event to such third parties for additional assistance in locating and/or recovering the target 110 or coordinating with emergency responders. In some embodiments, event response system 100 may include an operator application 400 for use by PSAP or private service operators in assessing the circumstances of the event, dispatching public or private responders 140, and/or coordinating caregivers 120 and/or responders 140 in responding to the event, amongst other related tasks associated with providing intelligent guidance and real-time information. Stated otherwise, operator application 400 may act as a command center from which an operator may orchestrate the response to the event. Operator application 400, in various embodiments, may be configured to run on devices 410 with relatively larger displays on which a large amount of information and interactive features may be provided to the operator. Devices 410, in some embodiments, may be fixed in a stationary location (e.g., set up at a dispatch center) or fixed in a mobile asset 160, such as in a mobile command unit as later described. It should be recognized that public and private responders 140 may also utilize mobile application 300 for on-site coordination and information sharing.

Figure 1C:
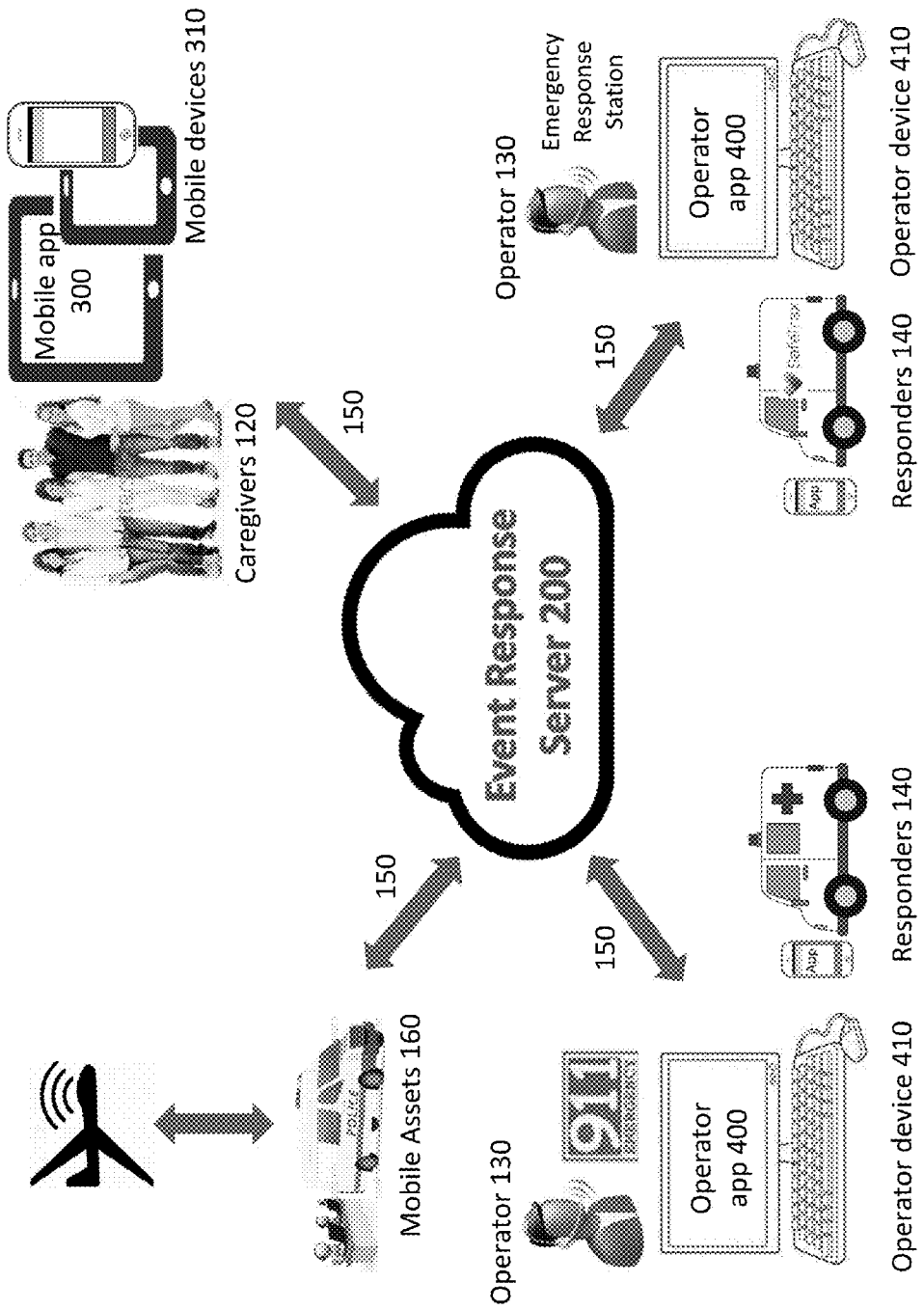
FIG. 1C schematically depicts a system for coordinating caregivers, public/private responders, and mobile assets in responding to an event, in accordance with one embodiment of the present disclosure.

Referring now to FIG. 1C, event response system 100 in various embodiments may additionally or alternatively include one or more communication links 150 for sharing information regarding the event and associated response with one or more mobile assets 160, such as a manned- or unmanned-vehicle, shown here as a mobile command unit (MCU) and an unmanned aerial system (UAS). Mobile assets 160 may be configured to provide operational support, video- and sensor-based search capabilities, communication relays, and other useful services to assist in coordinating a response to the event. In some embodiments, manned mobile assets 160 may utilize one or both of event response mobile application 300 and operator application 400 for on-site coordination and information sharing.

Referring now to FIG. 1D, event response system 100 in various embodiments may additionally or alternatively include one or more communications links 150 to an event detection and tracking system 500. In one aspect, event detection and tracking system (EDTS) 500 may be configured for detecting when an event has occurred, and notifying one or any combination of event response server 200, caregiver(s) 120, and PSAP/private operators 130, or any other party that may be involved in monitoring and/or responding to the event. In some such embodiments, EDTS 500 may include one or more sensors 510 configured to detect when the target 110 has left a safe zone and/or entered a keep out zone, or has activated a help button, and in response, trigger an event, as later described in more detail. Additionally or alternatively, EDTS 500 may be configured to send information concerning a location of the target 110 during the event to assist caregivers 120 and responders 140 in tracking the movements of and recovering the target 110. In some such embodiments, EDTS 500 may include a wearable locator device 530 configured for sending information concerning its location (and thus that of the target 110 wearing device 530) to one or more components of event response system 100, as later described in more detail.

Event Response Server 200

Figure 2:
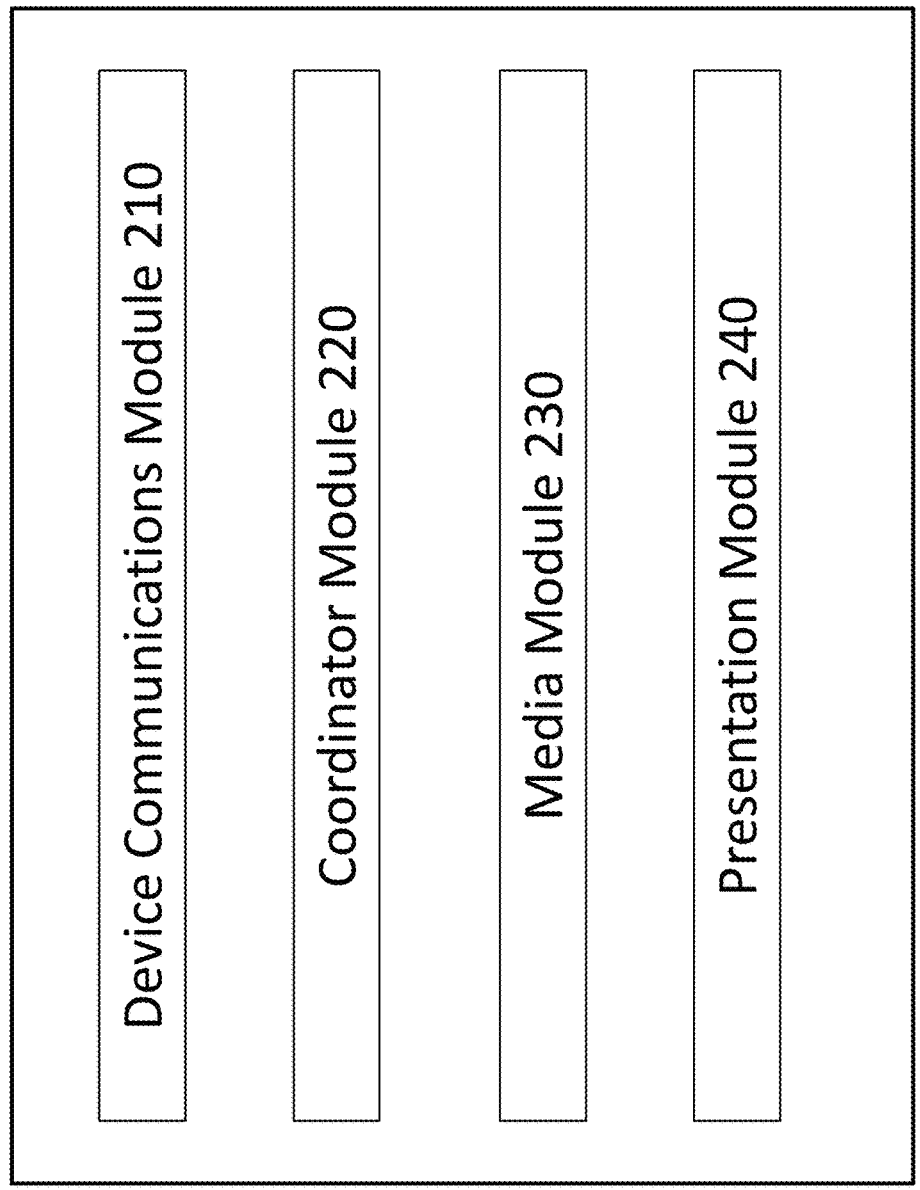
FIG. 2 schematically depicts a server for receiving and sharing information with mobile devices, in accordance with one embodiment of the present disclosure.

Referring now to FIG. 2, illustrated is a representative embodiment of event response server 200 of event response system 100. Event response server 200 may include one or more modules that may operate individually or in combination to manage various aspects of event response system 100. In the representative embodiment shown, event response server 200 may generally include a device communications module 210, a coordinator module 220, a media module 230, and a presentation module 240.

Device communications module 210, in various embodiments, may be configured for managing the flow of information between the various devices used in system 100, such as the mobile devices 310 carried by caregivers 120 and responders 140, as well as the components of EDTS 500 (e.g., sensor 510, base station 520, and wearable locator device 530). In particular, device communications module 210 may be configured to establish communications links with these devices, send requests for information, receive pushed information, and route the information in accordance with the workflows later described in the present disclosure. Device communications module 210, in an embodiment, may manage the sharing of information concerning mobile devices 310, such as the caretakers' 120 availability status and their locations, vectors, and/or speed, so the caretakers 120, operators 130, and responders 140 can understand where the various responding parties are and how they are moving. In another embodiment, device communications module 210 may manage the sharing of alert information from base station 520 of EDTS 500. In yet another embodiment, device communications module 210 may manage the sharing of information concerning wearable locator device 530 of EDTS 500, such as biometrics of the target 110, batter life, and location/vector/speed, as later described in more detail.

Coordinator module 220, in various embodiments, may be configured to execute logic for executing event response logic in accordance with predetermined workflows, such as those later described in FIGS. 5A-5B and 7A-7C. For example, coordinator module 220 may be configured to determine whether an incoming event is low, mid, or high priority based on the risk of danger to the target 110 or other persons. In another embodiment, coordinator module 220 may be configured to determine whom to contact, with whom to share information, and what to do next. Coordinator module 220 may interface with one or more databases for retrieving information related to the event and event response, such as records of previous events, stored information concerning the target, stored information concerning caregivers 120, contact information for relevant PSAP or private event response operators 130, and stored information concerning the locations and capabilities of those PSAPs/private response teams. Coordinator module 220 may use such information as inputs into predetermined logic to determine what actions to execute and what workflow to follow.

Media module 230, in various embodiments, may manage the flow of voice, text, video streaming, and other forms of communications between the parties and assets involved in the event response. In an embodiment, media server 230 may be configured for establishing the necessary communications links for conference calls between caretakers 120, operators 130, responders 140, and anyone else involved. In another embodiment, media server 230 may manage streaming and/or other data flow between mobile assets 160 and wearable locator device 530 with one another, and with other components of system 100.

Presentation module 240, in various embodiments, may provide the front end of system 100. In an embodiment, presentation module 240 is an application program interface (API) based on a set of routines, protocols, and tools for building mobile application 300 and operator application 400. Presentation module 240, in some embodiments, may specify how software components should interact, and may be used for programming the graphical user interface (GUI) of apps 300, 400.

Event Response Mobile Application 300

Figure 3C:
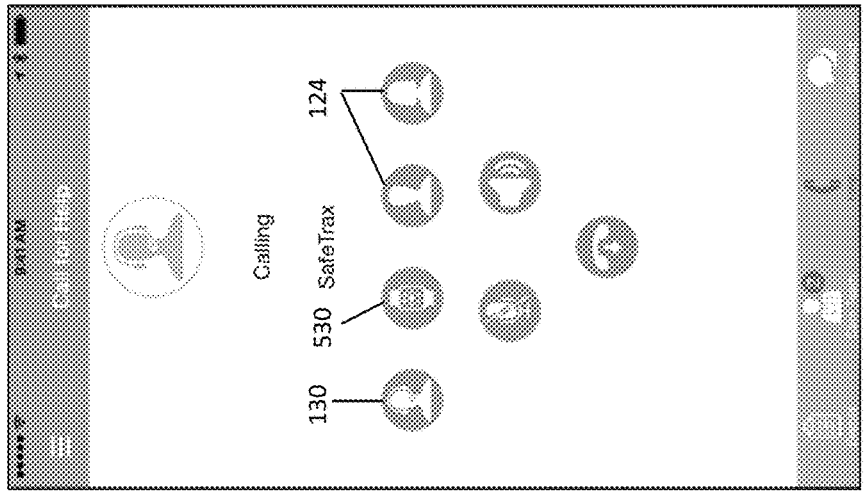
FIGS. 3A-3C are screenshots of a graphical user interface of a mobile application, in accordance with one embodiment of the present disclosure.
Figure 3B:
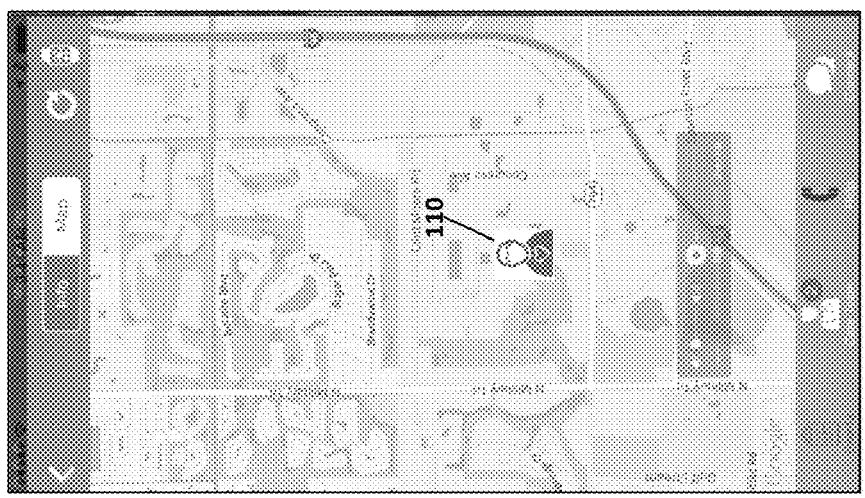
Figure 3A:
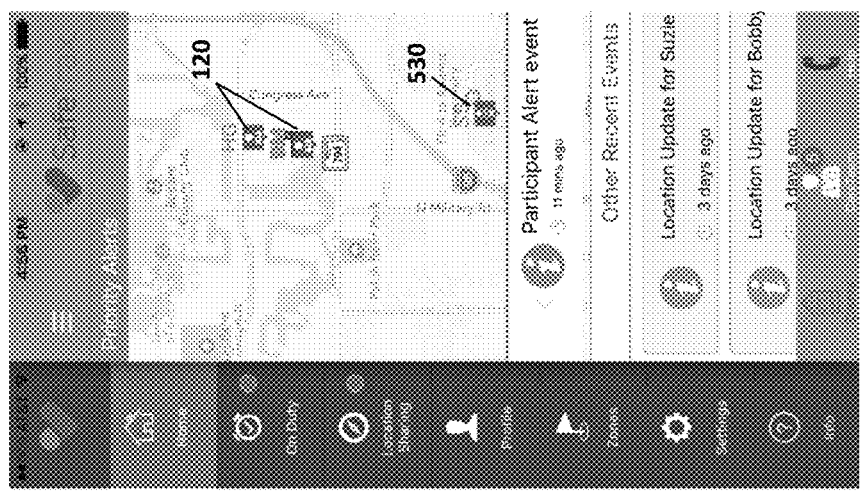

Event response system 100 may further include a mobile application 300 for use on a mobile device 310. Generally speaking, mobile application 300 may be configured to send, receive, process and display information from a number of sources via mobile device 310 to assist in the event response. Mobile application 300, in various embodiments, may be configured to display information on the associated mobile device 310 via a graphic user interface (GUI), as shown in FIGS. 3A-3C and later described.

In particular, in various embodiments, mobile application 300 may be configured to receive information from event response server 200 and display it to a user of the associated mobile device 310 (e.g., caregiver 120) in a useful manner to assist in the event response. This information may be sent from event response server 200 to mobile application 300 either automatically or in response to a request from mobile application 300. Example information received by mobile application 300 from event response server 200 may include, without limitation, a location of target 110, locations of other caregivers 120, responders 140, mobile assets 160, and the health status of the target 110, amongst other relevant information.

Mobile application 300 may additionally or alternatively be configured to automatically send information from the associated mobile device 310 to event response server 200. For example, mobile application 300 may pull information from mobile device 310 (or any databases or other sources of information to which it may be connected) such as GNSS, GPS, or other information concerning the location of the mobile device 310 (and by extension, the person carrying the mobile device 310). This information may be sent from mobile application 300 to event response server 200 either automatically or in response to a request from event response server 200. In some embodiments, event response server 200 may share the information received from mobile application 300 with other instances of mobile application 300 running on the mobile devices 310 of other caregivers 120 or responders 140. Additionally or alternatively, in other embodiments, event response server 200 may process and make decisions based on the information received from one or more instances of mobile application 300 running on the caregivers' mobile devices 310.

Mobile application 300, in various embodiments, may additionally or alternatively be configured to send information to and/or receive information from other mobile devices running other instances of mobile application 300 on other mobile devices 310, without the information or requests therefore being routed through event response server 200. In some embodiments, two or more instances of mobile application 300 may be configured to direct associated mobile devices to establish direct communication links between one another for sending and receiving the information. For example, two such devices may communicate directly with one another via communications links that do not require an established network, such as radio frequency signals. In other embodiments, communications between mobile applications 300 may be routed through an established network such as, without limitation, a cellular network, satellite network, or WiFi. In some embodiments, these networks may be supported by fixed infrastructure (e.g., towers), orbiting or geostationary infrastructure (e.g., satellites), mobile infrastructure (e.g., manned or unmanned aerial, aquatic, or terrestrial vehicles), or any suitable combination thereof. Example information exchanged between mobile applications without routing through event response server 200 may include, without limitation, voice and text communications, and information concerning the locations of the respective mobile devices, amongst other relevant information.

Still further, mobile application 300 may additionally or alternatively be configured to send information to and/or request information from event response server 200 and/or other instances of mobile application 300 in response to commands from a user of the associated mobile device 310. In such embodiments, mobile application 300 may include an interactive graphic user interface configured to receive commands from the user via the associated mobile device 310. As later shown in FIG. 3C, in an embodiment, mobile application 300 may include icons, widgets, or similar, that are configured to execute corresponding commands when selected by a user of the associated mobile device (e.g., tapped on via a touchscreen of mobile device 310). For example, a user may tap on an icon associated caregiver 120 to request, via mobile application 300 from event response server 200, information about that caregiver 120 such as his/her on-duty status, location, connectivity, etc. As another example, a user (e.g., caregiver 120, responder 140) may tap on another icon in mobile application 300 to declare an event. Mobile application 300, in various embodiments, may in turn send information concerning the event to event response server 200 and/or request information from event response server 200 concerning caregiver team and other relevant information.

Mobile application 300, in various embodiments, may send information to or request information from other components of event response system 100, such as operator application 400 and event detection and tracking system 500 (if equipped). The information may be sent and/or requested either directly or indirectly through another component of event response system 100.

FIGS. 3A-3C, depict various representative graphic user interfaces (GUI) that may be rendered by mobile application 300 for displaying information to and providing interaction with a caregiver 120 or responder 140 on mobile device 310.

Referring first to FIG. 3A, illustrated is a base menu having several tabs for opening different features of mobile application 300. The Home tab, for example, displays information about an event and ongoing response, such as a map with icons showing the locations of caretakers 120 and target 110 (here, via location information provided by wearable locator 530). The On Duty tab includes an indicator of the on- or off-duty status of the particular caretaker 120 using the mobile application 300 (green for on-duty, red for off-duty). When this tab is opened, this particular caretaker 120 may view the on- or off-duty statuses of other caretakers 120. The Location Sharing tab similarly includes an indicator showing whether this particular caretaker 120 using the app is allowing the application to share his or her location information with other caretakers 120 and event response server 200 (green for yes, red for no). The Profile tab contains the user's profile, which contains information such as name, role, and contact information. The Zones tab lists various safe zones and/or keep out zones established for the particular target 110, and shows the respective locations of each. The Settings tab provides user capability to sign in/out, perform a system test, and other support information. Along the bottom of base menu are interactive elements showing careteam updates, and providing a link to customer support (i.e., the "help" element).

Referring now to FIG. 3B, illustrated is another map that allows caretaker 120 to check in on the location of target 110 (possibly via wearable locator device 530).

Referring now to FIG. 3C, illustrated is a menu from which a primary caregiver 120 may declare that an event has occurred, and thereby initiate first steps of the response process. On this example menu, interactive icons are provided for communicating with operator 130 (e.g., speak with or escalate the event to the operator), communicating with wearable locator device 530 (e.g., call the device or issue a command to activate the device's visual/audible alarm feature), and contacting other caregivers 120.

As configured, mobile application 300 combines the most relevant information and presents it, along with various interactive elements, to caregiver 120 or responder 140 on the small-to-mid sized display characteristic of most mobile devices 310. Distilling the information into that most relevant allows the caregiver 120 or responder 140 to utilize the information while on the go, without being burdened by carrying a large display or trying to view too much information on a small display. This may enhance caregivers 120/responders 140 ability to locate the target 110 and share information during event response.

Operator Application 400

Figure 4:
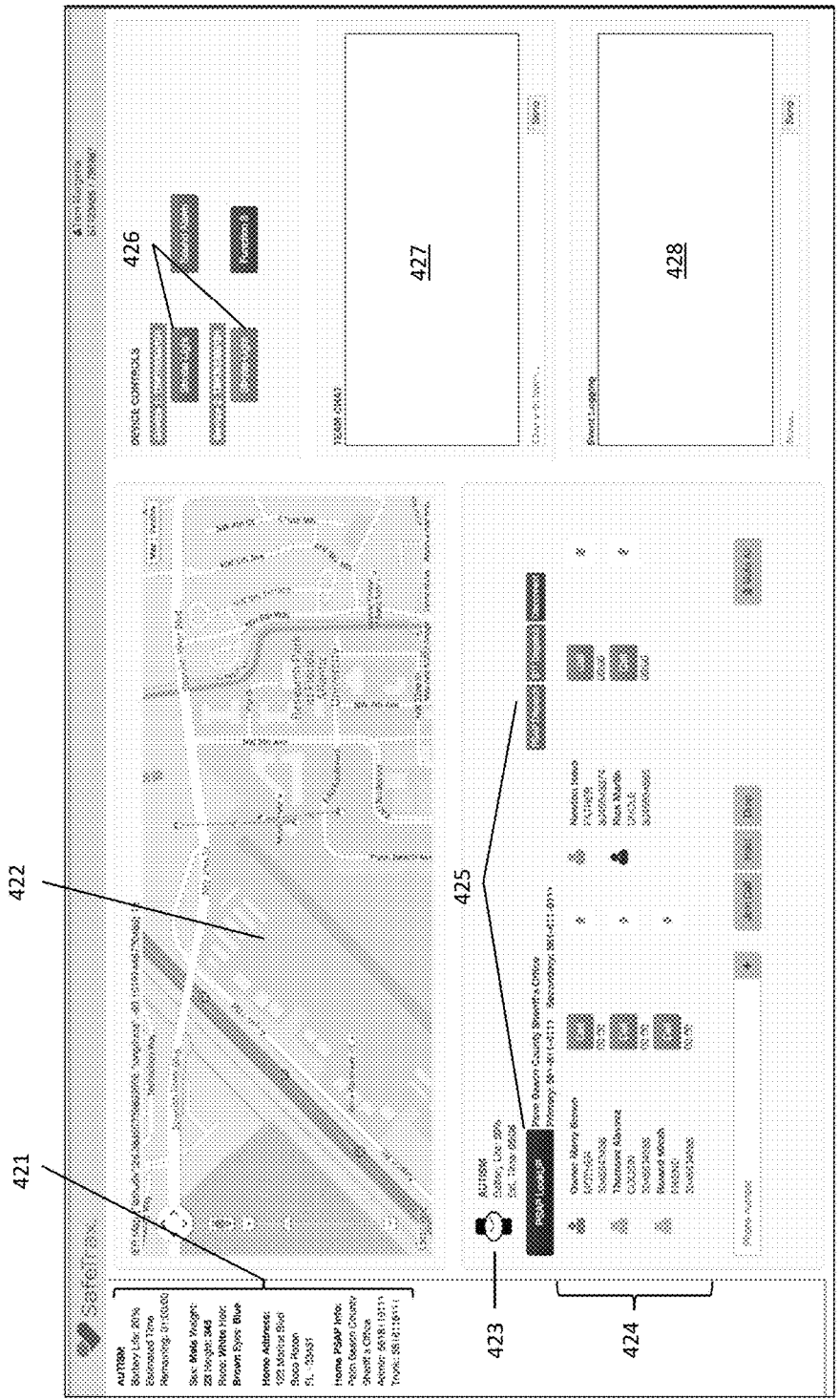
FIG. 4 is a screenshot of a graphical user interface of an operator application, in accordance with one embodiment of the present disclosure.

Operator application 400 of event response system 100 may be configured to send, receive, process and display information from a number of sources via operator device 410 to assist PSAP and private operators in coordinating the response to the event. Operator application 400, in various embodiments, may be configured to display information on the associated operator device 410 via a graphic user interface (GUI), as shown in FIG. 4 and later described.

Similar to mobile application 300, operator application 400 may be configured to receive information from event response server 200 and display it to a user of operator device 410 (e.g., a PSAP/private operator) in a useful manner to assist in the event response. This information may be sent from event response server 200 to operator application 400 either automatically or in response to a request from operator application 400. Example information received by operator application 400 from event response server 200 may include, without limitation, information concerning target 110 (e.g., name, appearance, medical conditions, known tendencies), information concerning the location of any one or combination of target 110, caregivers 120, responders 140, and mobile assets 160, contact information for caregivers 120, PSAP or private operators 130, and responders 140, and information concerning any wearable locator device 530 the target 110 may be wearing, including battery life.

Operator application 400 may additionally or alternatively be configured to automatically send information from the associated operator device 410 to event response server 200. For example, operator application 400 may pull any of the above information from operator device 410 (or any databases or other sources of information to which it may be connected). This information may be sent from operator application 400 to event response server 200 either automatically or in response to a request from event response server 200. In some embodiments, event response server 200 may share the information received from operator application 400 with instances of mobile application 300 running on mobile devices 310 of caregivers 120 or responders 140. Additionally or alternatively, in other embodiments, event response server 200 may process and make decisions based on the information received from operator application 400 running on operator device 410.

Operator application 400 may also additionally or alternatively be configured to send information to or request information directly or indirectly from any one or combination of event response server 200 and mobile application 300 on mobile device(s) 310. This may be done automatically or in response to commands issued by the operator. Similarly, operator application 400 may send information to or request information from event detection and tracking system 500 (if equipped), either directly or indirectly through another component of event response system 100.

FIG. 4 depicts a representative graphic user interfaces (GUI) that may be rendered by operator application 400 for displaying information to and providing interaction with operator 130 on operator device 410. In the present example, displayed is biographic information 421 about target 110, a map 422 showing real-time location updates of wearable locator device 530 worn by the target 110, information 423 concerning the battery life of wearable locator device 530, interactive icons 424 providing information about and contact with caregivers 120 and/or responders 140, interactive icons 425 for looking up and contacting operators 130 at PSAPs/private firms, interactive icons 426 for controlling visual and audio alarms on wearable locator device 530, a window 427 for text communication with others involved in the event response, and a window 428 for logging relevant information about the event and associated response. As configured, operator application 400 combines relatively large amounts of relevant information and presents it, along with various interactive elements, to operator 130 on a large, well-organized display. The additional information presented to operator 130 by operator application 400, as compared to that which may be displayed to caregiver 120 or responder 140 by mobile application 300, may enhance operator's 130 ability to orchestrate event response.

Methods for Coordinating Response

Figure 5A:
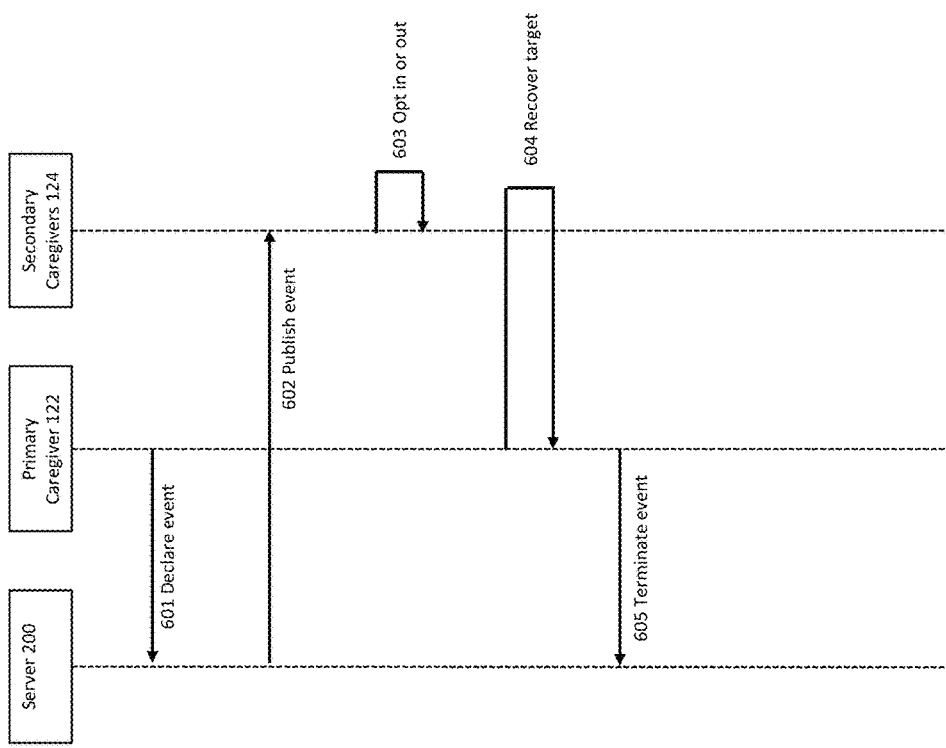
FIG. 5A depicts a workflow for managing the flow and processing of information between a caregiver team during a response, in accordance with one embodiment of the present disclosure.
Figure 5B:
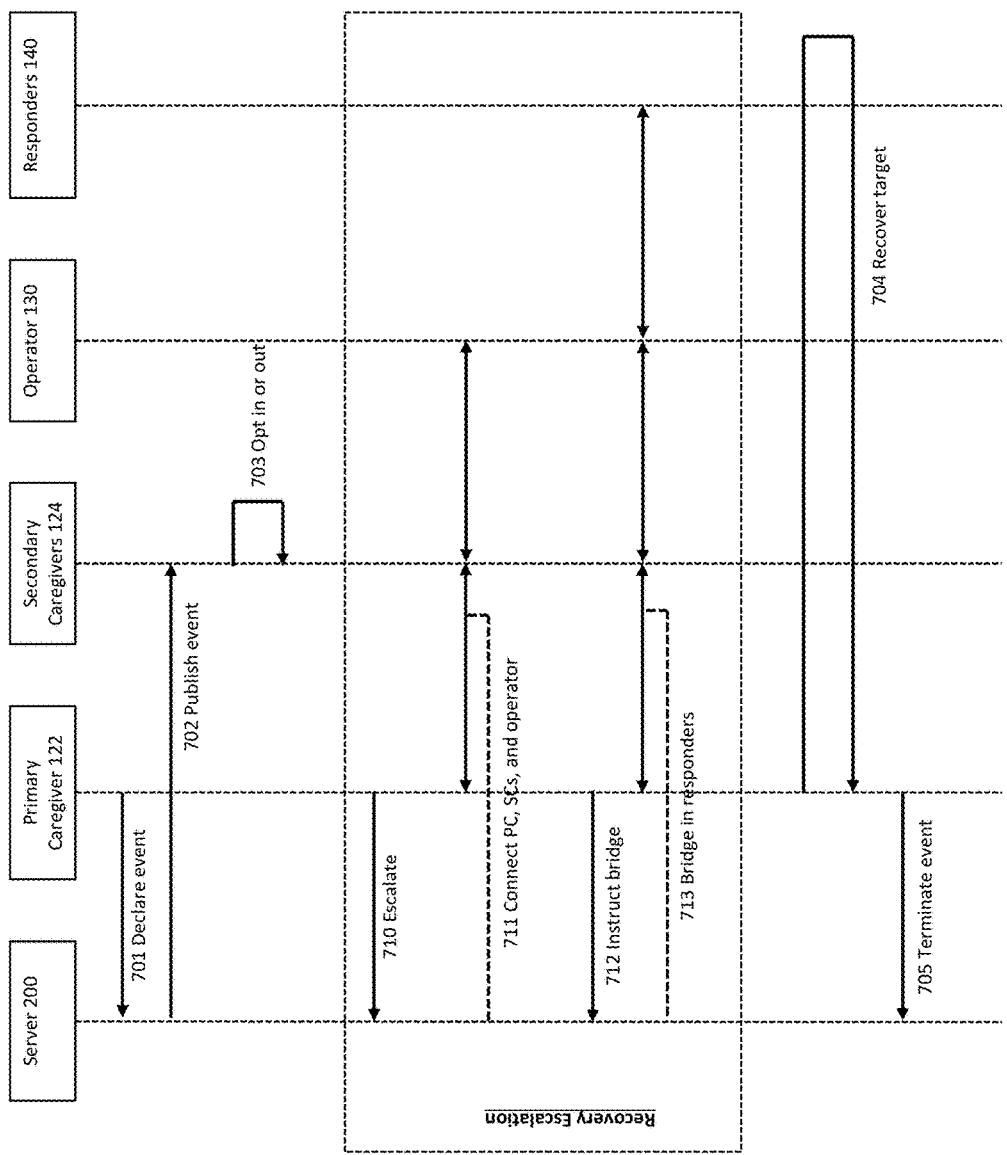
FIG. 5B depicts a workflow for managing the flow and processing of information between a caregiver team, an operator, and responders during a response, in accordance with one embodiment of the present disclosure.

Referring now to FIGS. 5A and 5B, example workflows are provided to further describe ways in which event response system 100 may manage the flow and processing of information and communications between responding parties during a response to an event.

FIG. 5A depicts a workflow for an embodiment in which caregivers 120 initiate and conduct an event response.

Referring first to step 601, a primary caregiver 122 may determine that an event has occurred and declares an event using mobile application 300 on caregiver's mobile device 310. This may occur, for example, when primary caregiver 122 notices first hand that target 110 has left a safe zone or has entered keep out zone (later described). In another example, primary caregiver 122 may determine that an event has occurred based on second hand knowledge, such as a phone call from a concerned friend that witnessed the target 110 wandering through the woods outside of the safezone. Of course, these are merely hypothetical scenarios leading to primary caregiver 122 declaring an event requiring response, and the present application is not intended to be limited to any particular scenario. Further, while not shown, any secondary caregiver 124 may declare the event should they determine that an event has occurred. Mobile application 300 processes the event declaration and routes it, along with any relevant information concerning the event, to event response server 200.

Referring to step 602, event response server 200 may process the event declaration and associated information from mobile application 300 and may publish the event to the mobile application 300 on each of the secondary caregivers' mobile devices 310. Mobile application 300 then notifies the secondary caregivers 124 on their mobile devices 310.

Referring to step 603, upon receiving the notification on their mobile devices 310, caregivers 120 may log into mobile application 300 to view information concerning the event or receive a push notification. Caregivers 120 may then opt to actively join in responding to the event, to continue monitoring the information concerning the event and/or the response thereto, or to decline to engage in the response and further monitoring. In an embodiment, mobile application 300 may receive any given caregiver's 120 selection and notify, via event response server 200, the primary caregiver 122 and/or secondary caregivers 124 of the selections made by the other caregivers 120, so that all caregivers 120 are aware of who is and is not engaged in the response. Caregivers 124 may subsequently change their selection, thereby allowing them to actively join the response, withdraw from the response, or switch to a monitoring mode at any time.

Referring to step 604, primary caregiver 122 and secondary caregivers 124 who have opted in at step 603 may continue to share information during the process of recovering target 110, as previously described. For example, in an embodiment, event response sever 200 may join the caregivers 120 to a conference call, share the locations and opt-in/opt-out status of each caregiver 120, provide information concerning the particular target 110 (e.g., name, age, a photo or appearance description, any medical conditions, any relevant tendencies), provide weather and terrain information in the area, etc. This information may be updated in real-time throughout the search by event response server 200 as it manages and processes information provided by mobile application 300 on each caretaker's mobile device 310, as previously described.

Referring to step 605, once target 110 is recovered or the event is otherwise determined to be over, primary caregiver 122 may sound the "all clear" via mobile application 300, which in turn sends a command to server 200 to terminate the event response. In an embodiment, a record of the event may be created and stored for subsequent review and/or use in future event responses.

FIG. 5B depicts a workflow for an embodiment in which an event response is escalated to a public or private operator 130 for joining third party public or private responders 140.

In this embodiment, steps 701-705 may be substantially similar to steps 601-605 described in the context of FIG. 5A; however, at any suitable time during the workflow, event response may be selectively or automatically escalated to operator 130 and responders 140. In one such embodiment, caregiver(s) 120 may utilize mobile application 300 to selectively escalate the event. Additionally or alternatively, in another embodiment, event response server 200 may be configured to automatically escalate the event based on any number of factors, such as a determination of the event priority (i.e., the severity and danger posed by the event to target 110 or others).

In the example shown in FIG. 5B, at step 710, primary caretaker 122 has opted to selectively escalate the event via mobile application 300. The escalation request may be sent from mobile device 310 to event response server 200, where it is processed. In an embodiment, event response server 200 may automatically establish a communications link, such as a phone call, between primary caregiver 122, secondary caregivers 124, and operator 130, as shown in step 711. To assist in providing clear initial communication between primary caregiver 124 and operator 130, in an embodiment, server 200 may optionally mute the communications links with secondary caregivers 124. Once primary caregiver 122 has briefed operator 130, at step 712, primary caregiver 122 may instruct event response server 200, via his/her mobile application 300, to bridge in responders 140 into the conference call with primary caregiver 122, secondary caregivers 124, and operator 130. Server 200 may unmute the communications link with secondary caregivers 124 (if previously muted), and may bridge in responders 140 at step 713.

Event response server 200 may additionally or alternatively provide other information concerning the event and the response to operator 130 and/or responders 140. For example, in an embodiment, relevant information may be displayed to operator 130 and responders 140 on operator device 410 and mobile devices 310, respectively, as shown in FIG. 4. This may provide situational awareness to responders 140 as they physically engage in the recovery process or act in an advisory role to assist caretakers 120 in ongoing recovery efforts.

Event Detection and Tracking System 500

Referring now to FIGS. 6A-6D, event response system 100, in various embodiments, may further include an event detection and/or tracking system (EDTS) 500. In some embodiments, EDTS 500 may be configured to detect activity associated with an event occurring and, in response, notify event response server 200. Additionally or alternatively, EDTS 500 may be further configured to transmit the target's 110 location to facilitate his/her recovery after an event has occurred. It should be recognized that EDTS 500 may be configured for any one or combination of these purposes.

Referring first to FIGS. 6A-6C, EDTS 500 as configured for detecting activity associated with an event occurring may generally include at least one sensor 510 and a base station 520. Sensor(s) 510 may include any suitable electronic device configured to directly or indirectly detect the presence or movement of the target 110 in or through a given area. Example sensor(s), in embodiment, include ranged motion sensors configured to directly detect the presence and/or motion of a person, such as passive infrared, microwave, area reflective, and ultrasonic. In another embodiment, sensor(s) 510 may include sensors known in the art for detecting when a ingress/egress point (e.g., door, window) or storage structure (e.g., cabinet, chemical shed) has been opened and/or passed through.

Additionally or alternatively, in some embodiments, sensor(s) 510 may include electronic sensors configured to detect the presence of a designated electronic device, such as a wearable locator device 530 worn by the target 110 such as a locator watch, anklet, pendant, animal collar, etc. In some such embodiments, sensor(s) 510 may utilize passive or active scanning, RFID, or other suitable technology to detect the presence or movement of wearable locator device 530. As configured, EDTS 500 may be able to distinguish between activity associated with target 110 and that associated with a caregiver 120 or other non-target. Of course, EDTS 500, in various embodiments, may be configured to make such distinctions absent a wearable locator device 530 worn by the target 110. For example, EDTS 500, in an embodiment, may be configured to instead recognize a device associated with caregiver 120 (e.g., mobile device 310 or a wearable device) and stand down from triggering an alert when the activity is associated with the caregiver 120. As another example, EDTS 500 may be configured to recognize the target 110 specifically based on body size, appearance, or other physical attributes, and thus distinguish the target 110 from other persons on the premises. In yet another example, EDTS 500 may be configured to activate only when a mobile device 310 or wearable device of a caregiver 120 is not present on the premises.

Sensor(s) 510, in some embodiments, may be configured to define one or more "keep out" zones and/or "safe" zones, which can be used to determine when an event occurs. Keep out zones, for example, may be established in predetermined areas in which the target 110 may encounter hazards or other dangers, such as chemicals, stairs, sharp objects, swimming pools, etc. As shown in FIGS. 6A and 6B, in an embodiment, sensor(s) 510 may be installed at ingress points (e.g., doors, windows) to a room or area to establish a keep out zone within the room or area. As configured, should the target 110 enter the keep out zone (identified here as the room with the triangular warning symbol), sensor(s) 510 may detect this activity and automatically notify base station 520. In response, base station 520 may analyze the notification against stored parameters to determine if the notification may be a false alarm, and if not a false alarm, may notify event response serve 200 that event has occurred. Of course, one or more ranged motion sensors 510 may be utilized for the same purpose either inside the room or area, or near an ingress point thereof (not shown). Further, it should be understand that in some embodiments, EDTS 500 may not include base station 520, and instead sensors 510 may communicate information to server 200 via LPWAN, cellular network, or other suitable communications network.

Safe zones, in an embodiment, may be established in like manner by installing sensors 510 at egress points of a room or area deemed to be safe or permissible for the target 110 to be in. Should the target 110 leave the safe zone (identified here as the inside of the house), sensor(s) 510 may detect this activity and automatically notify base station 520. In response, base station 520 may analyze the notification against stored parameters to determine if the notification may be a false alarm, and if not a false alarm, may notify event response serve 200 that an event has occurred.

It should be recognized that sensors 510 need not be fixed in location, but rather may additionally or alternatively move in some applications. For example, in an embodiment, caregiver 120 may be provided with a wearable sensor 510 configured to define a safe zone about the caregiver 120 that moves with the caregiver 120. Should the target 110 leave the safe zone (or the caregiver 120 move too far away from the target 110), sensor 510 (or alternatively, wearable locator device 530 itself) may detect that the target 110 is outside of the predetermined boundaries of the safe zone and may trigger an alert to event response system 100 or directly to mobile device 310 of caregiver 120. Such an embodiment may have a number of real-world applications, just a couple of which include safely keeping track of children on a field trip, or keeping track of seniors with diminished cognitive functions while outside of an assisted living facility (e.g., on a trip to the market).

Sensor(s) 510, in some embodiments, may be configured to operate alone or in combination with other sensor(s) 510. One of ordinary skill in the art will recognize suitable types and arrangements of sensor(s) 510 and base station 520 for a given application.

Referring now to FIG. 6D, wearable locator device 530 may additionally or alternatively be configured to transmit its location (and thus that of the target 110 wearing it) to event response server 200 and/or other components of event response system 100 to facilitate locating and recovering the target 110 during the response. As configured, wearable locator device 530 may be configured to establish connectivity with GNSS, GPS, or other systems suitable for providing geospatial coordinates of the wearable location device. Additionally or alternatively, wearable locator device 530 may emit a beacon signal that may be triangulated by parties involved in the response. It should be recognized that wearable locator device 530 may be configured to provide location information (or information/signals from which location may be determined) in any other way for these purposes, and that they present disclosure is not intended to be limited to only those illustrative embodiments described above.

In one embodiment, base station 520 may automatically notify wearable locator device 530 that an event has occurred and command it to begin transmitting location information. In another embodiment, wearable locator device 530 may actively monitor whether it is within the boundaries of a safe zone or keep out zone, and automatically begin transmitting location data when it detects that a breach has occurred. In yet another embodiment, event response server 200 may be configured to establish connectivity with wearable locator device 530 (or vice versa), and command wearable locator device 530, via the wireless connection, to begin transmitting location data at any time.

Wearable locator device 530, in various embodiments, may additionally or alternatively include devices for generating visual and/or audio alarms to facilitate caregivers 120 and responders 140 in locating the target 110. For example, wearable locator device 530 may be outfitted with a strobe light and/or a speaker for emitting a high-pitched noise. In an embodiment, the alarm(s) may be automatically activated upon the detection of an event. In another embodiment, the alarm(s) may be configured to be selectively activated by event response server 200 (or other component of event response system 100, such as a caregiver's mobile device 310) during the response. While not intended limited as such, embodiments configured for selectively activating the alarm(s) may provide for better management of battery life in wearable locator device 530 through activation only when caregivers 120 and responders 140 believe they are within visual or audio range of the target 110. Further, selectively activating the alarm(s) may reduce the likelihood of the alarms bothering the target 110 and potentially driving him/her to try to remove wearable locator device 530 or hurting themselves if agitated by the sound or visual effect.

In still further embodiments, wearable locator device 530 may additionally or alternatively be provided with a display and/or audio system. In one such embodiment, wearable locator device 530 may be configured to display one or more images, videos, or sound files to the target 110 designed to alert the target 110 that he/she has wandered off or entered a dangerous area, in hopes that they may turn back. These may be customized with the image or voice of a person or persons familiar to the target 110, which may help calm the target 110 and/or elevate their cognitive state. In another embodiment, wearable locator device 530 may be configured to allow for caretakers 120 and responders 140 to directly communicate in real-time with the target 110 through the visual display, audio speaker, and/or audio microphone of wearable locator device 530. As configured, caretakers 120 and responders 140 may be able to ascertain the location of the target 110 either directly from the target 110 or by visual/audio clues in the background, as well as determine the target's 110 health status (i.e., whether conscious, hurt, in a delusional state, etc.) and calm the target 110, amongst other beneficial uses of these capabilities.

Methods for Detecting Events and Tracking a Target

Figure 7A:
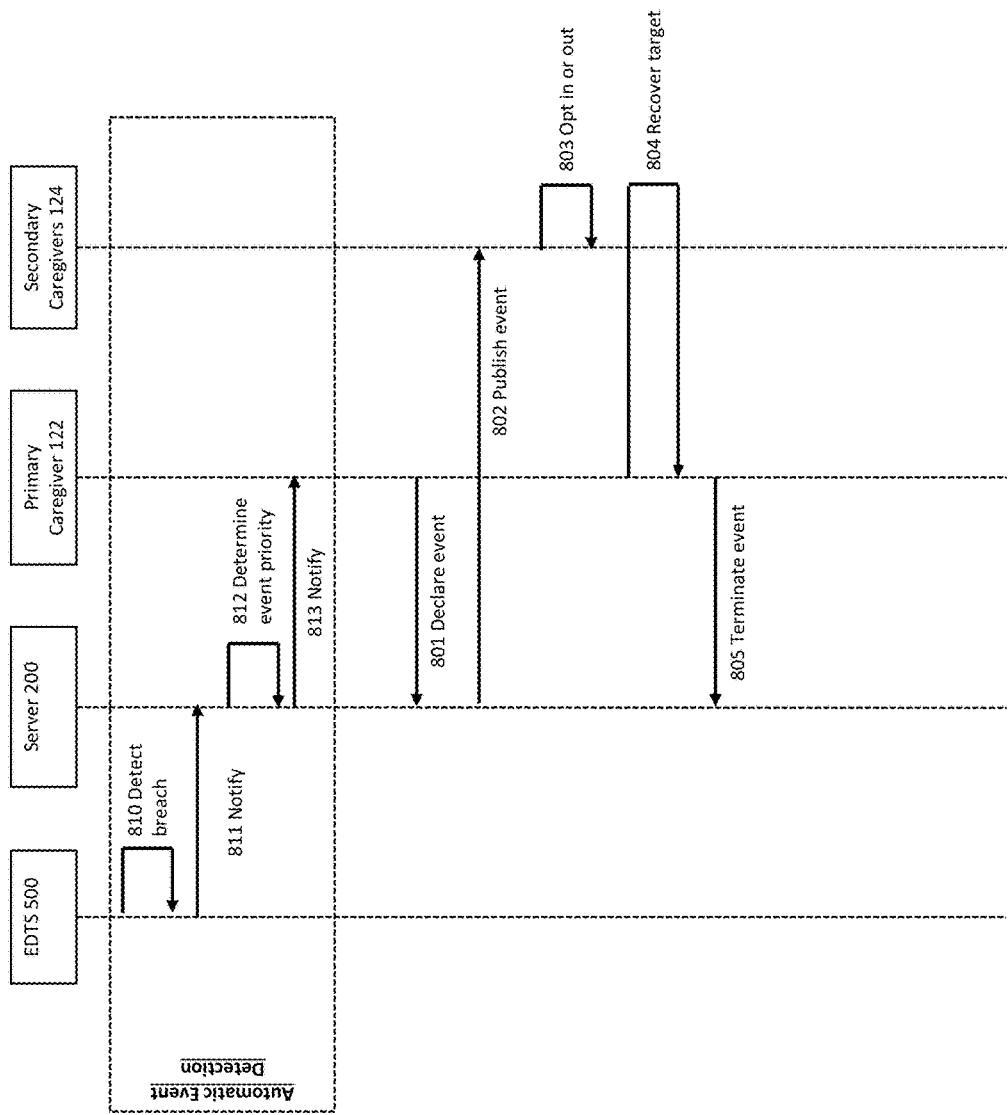
FIG. 7A depicts the incorporation of automatic event detection capabilities into a workflow for managing the flow and processing of information between a caregiver team during a response, in accordance with one embodiment of the present disclosure.
Figure 7B:
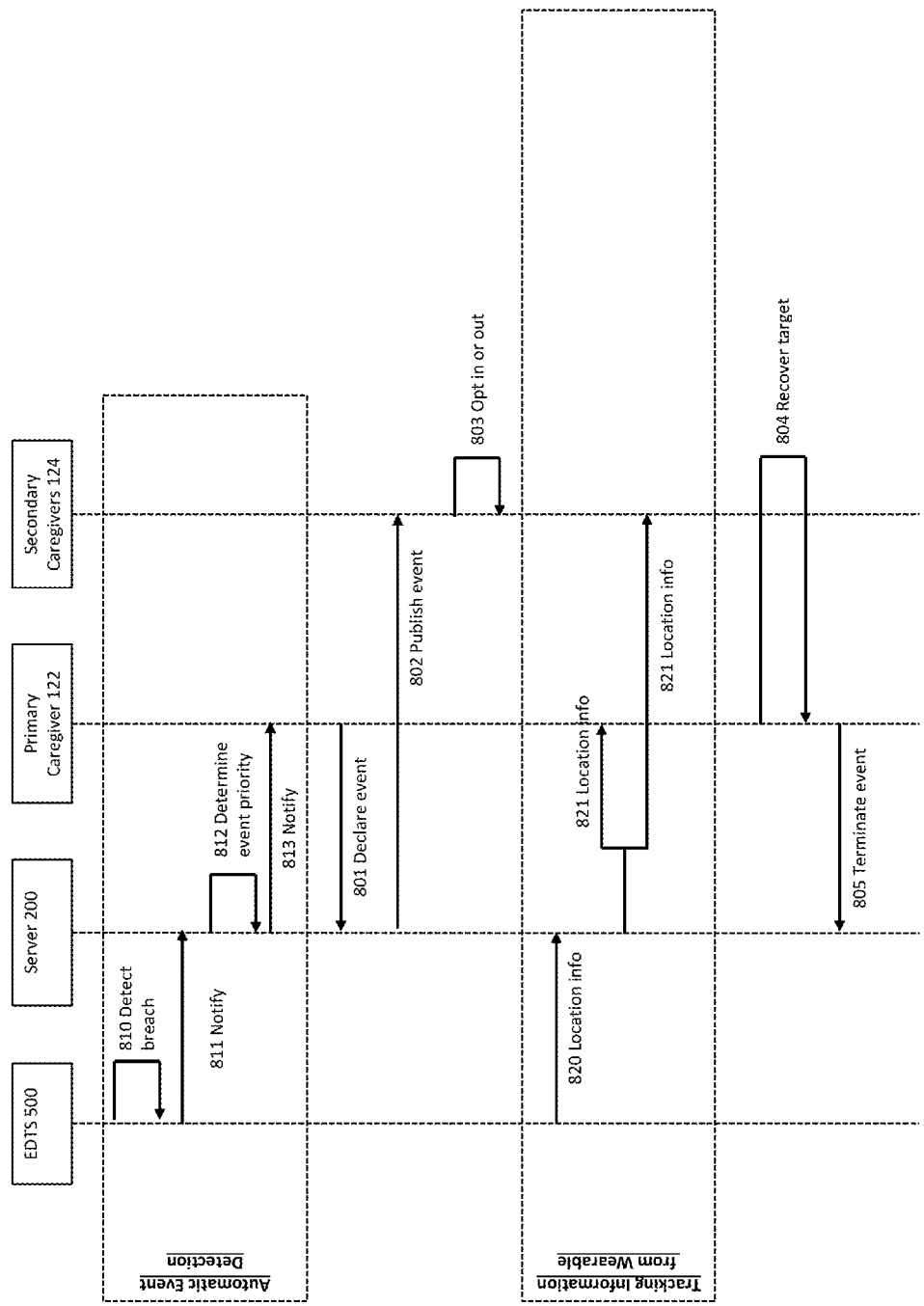
FIG. 7B depicts the incorporation of tracking information from a wearable locator device into a workflow for managing the flow and processing of information between a caregiver team during a response, in accordance with one embodiment of the present disclosure.
Figure 7C:
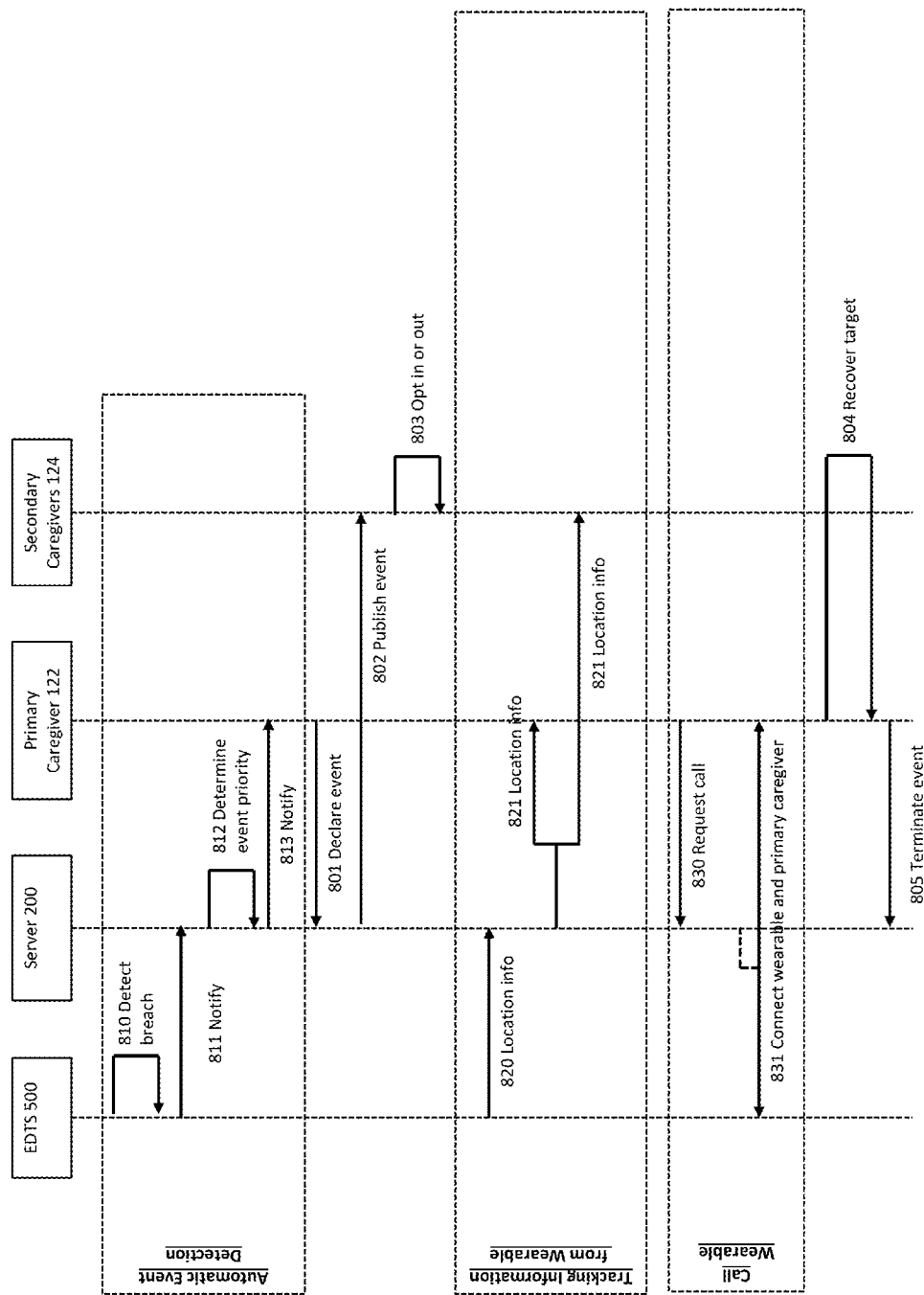
FIG. 7C depicts the incorporation capabilities to call a wearable locator device into a workflow for managing the flow and processing of information between a caregiver team during a response, in accordance with one embodiment of the present disclosure.

FIGS. 7A-7C depict example workflows of exemplary ways in which embodiments of EDTS 500 may be integrated into event response.

Referring first to FIG. 7A, the event detection capabilities of EDTS 500 may be leveraged to automatically notify event server 200 that an event has occurred. In particular, at step 810, sensors 510 may detect a safe zone or keep out zone breach and notify base station 520, as previously described. Base station 520 may analyze the notification against stored parameters to determine if the notification may be a false alarm. At step 811, base station 520 may notify event response serve 200 that event has occurred, as previously described. Event server 200, upon receiving notification of a potential event from EDTS 500, may automatically initiate event response protocol as shown. As configured, EDTS 500 may provide caretakers 120 and target 110 with enhanced comfort, flexibility, and autonomy in their daily lives by offloading the responsibilities of constantly monitoring the target 110 in-person.

Referring now to FIG. 7B, the tracking capabilities of EDTS 500 may be leveraged to provide the location of the target 110 throughout the response. In particular, at step 820, wearable locator device 530 may transmit location information to server 200. As previously described, wearable locator device 530 may be configured to automatically send the location information, or in the alternative, may be configured to await instructions from server 200 to do so. Upon receiving the location information from wearable locator device 530, server 200 may process the information and, at step 821, share it with caregivers 120.

Referring now to FIG. 7C, the visual and/or audio communication capabilities of EDTS 500 may be leveraged to speak to/with the target 110 during response to the event. At shown at step 830, primary caregiver 122 (and/or secondary caregivers 124, not shown) may utilize mobile application 300 request a connection with wearable locator device 530 via event response server 200. Server 200, may in turn, automatically connect wearable locator device 530 into a conference call or other form of collective real-time communication with mobile devices 310 of caregivers 120, as shown at step 831. The various parties in visual/audio communication with wearable locator device 530 may then communicate with target 110 during the response as previously described.

It should be recognized that, while not shown in FIGS. 7A-7C, the event may be escalated to operator 130 and responders 140 as in FIG. 5B at any suitable time. Server 200, in such embodiments, may be configured to automatically alert operator 130 in response to receiving an event alert from EDTS 500 (particularly one determined to be high priority). Additionally or alternatively, server 200 may be configured to share location information from wearable locator device 530 with operator 130 and/or responders 140, just as such information may be shared with primary and secondary caretakers 120. Still further, server 200 may be configured to connect operator 130 and/or responders 140 to the call with wearable locator device 530.

Figure 8:
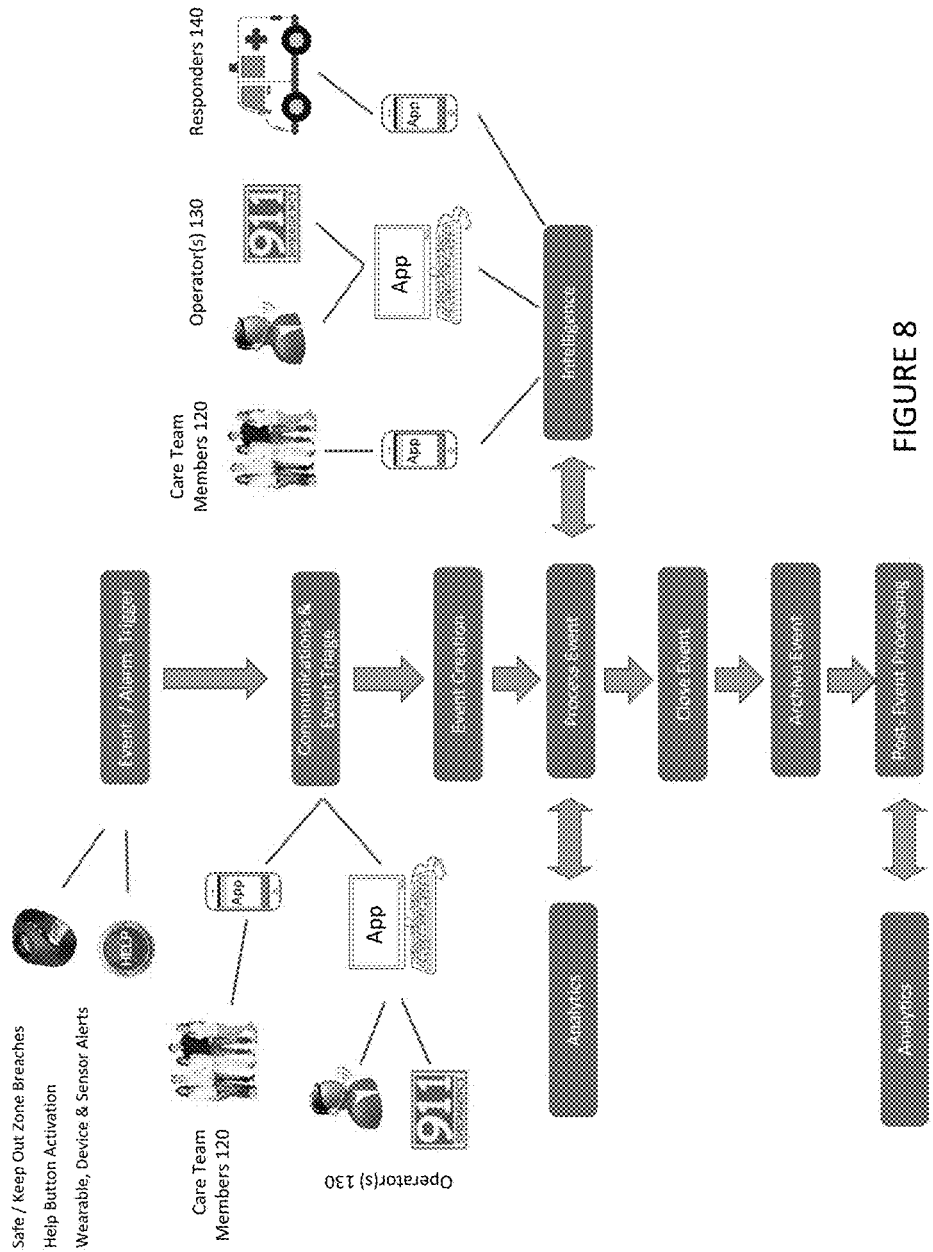
FIG. 8 depicts a representative workflow for detecting and coordinating a response to an event, in accordance with one embodiment of the present disclosure.

Referring now to FIG. 8, a high-level recap of a representative workflow is illustrated for additional clarity. EDTS 500 may send information suggestive of an event, that information may be communicated to relevant parties and processed by server 200 to determine whether an event has occurred and its priority, and an event is, in turn, created. Server 200 may manage the flow of information from various components of system 100 during the response to provide the responding parties with situational awareness, using continuously updated information from the responding parties. When target 110 is recovered (or the event otherwise determined to be all clear), server 200 may close the event, archive it, and in some embodiments, perform post-processing actions on the archived event to glean information that may be helpful in responding to future events involving the target 110 or other targets.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A system for coordinating a response to an event, the system comprising:
    a plurality of mobile devices for use by persons responding to an event;
    a mobile application running on each of the plurality of mobile devices, the mobile application being configured to send, via the plurality of mobile devices, information concerning a response to the event by the persons using the plurality of mobile devices; and
    a server configured to receive the information sent by the plurality of mobile devices,
    wherein the server is configured to identify, for each respective mobile device, which portion of the information is to be shared with that particular mobile device, the server identifying each respective portion based on a priority of the event and a role of the person using that particular mobile device,
    wherein the portion of the information shared with a first of the mobile devices varies at least in part from the portion of the information shared with a second of the mobile devices if the persons using those particular mobile devices have different roles,
    wherein the server is configured to selectively share, with each respective mobile device, only the respective portion of the information identified by the server to be shared with that particular mobile device,
    wherein the server is configured to provide each respective mobile device with continuous updates of the respective portion of the information selectively shared with that particular mobile device by the server for use in coordinating a collective response to the event by the persons, and
    wherein the mobile application generates, on each respective mobile device, a graphical user interface for presenting the respective portion of the information selectively shared with that particular mobile device.

2. A system as set forth in claim 1, wherein at least one of the plurality of mobile devices includes a smart phone or a tablet.

3. A system as set forth in claim 1, wherein the information sent by the mobile application includes information concerning at least one of a location of the mobile devices, a direction of movement of the mobile devices, a speed of movement of the mobile devices, and an on-duty status of the persons using the mobile devices.

4. A system as set forth in claim 1, wherein the mobile application is configured to show on a map at least one of a location, vector, and speed of the mobile devices, for providing the persons with situational awareness regarding the locations and movements of the persons using the mobile devices.

5. A system as set forth in claim 1, wherein the server includes a device communications module for managing the flow of the information between one or more of the mobile devices, and between the server and the mobile devices.

6. A system as set forth in claim 1, wherein the server includes a coordinator module for executing predetermined logic defining a workflow for the event response.

7. A system as set forth in claim 1,
further comprising an operator application for running on an operator device,
wherein the server is configured to selectively share at least some of the information received from the plurality of mobile devices with the operator device, and
wherein the operator application is configured to display at least some of the information selectively shared with the operator device by the server concerning the response of each person to the event on the operator device for providing an operator with situational awareness during the event response.

8. A system as set forth in claim 1, further comprising one or more sensors for detecting activity associated with the event occurring.

9. A system as set forth in claim 8, wherein the one or more sensors, or a base station in communication with the one or more sensors, is configured to notify the server of a detection of the activity associated with the event occurring.

10. A system as set forth in claim 1, further comprising a wearable locator device for wearing by a target of the event response, the wearable locator device being configured to provide information concerning its location to the server.

11. A method for coordinating a response to an event, the method comprising:
providing a plurality of mobile devices for use by persons responding to an event;
sending, via the plurality of mobile devices, information concerning a response to the event by the persons using the plurality of mobile devices;
identifying, for each respective mobile device, which portion of the information is to be shared with that particular mobile device,
wherein each respective portion is identified based on a priority of the event and a role of the person using that particular mobile device;
wherein the portion of the information shared with a first of the mobile devices varies at least in part from the portion of the information shared with a second of the mobile devices if the persons using those particular mobile devices have different roles,
providing each respective mobile device with continuous updates of the respective portion of the information selectively shared with that particular mobile device for use in coordinating a collective response to the event by the persons; and
generating, on each respective mobile device, a graphical user interface for presenting the respective portion of the information selectively shared with that particular mobile device.

12. A method as set forth in claim 11, wherein at least one of the plurality of mobile devices includes a smart phone or a tablet.

13. A method as set forth in claim 11, wherein the information sent includes at least one of a location of the mobile devices, a direction of movement of the mobile devices, a speed of movement of the mobile devices, and an on-duty status of the persons using the mobile devices.

14. A method as set forth in claim 11, wherein in the step of sending, the information is sent directly or indirectly to a remote server.

15. A method as set forth in claim 11, wherein in the step of selectively sharing, at least some of the information sent from the mobile devices is selectively directed to each of the mobile devices.

16. A method as set forth in claim 11, wherein in the step of generating, at least one of a location, vector, and speed of the mobile devices is presented on a map, for providing the persons with situational awareness regarding the locations and movements of the persons using the mobile devices.

17. A method as set forth in claim 11, further including the step of selectively sharing at least some of the information sent by the plurality of mobile devices with an operator at a public safety answering point or private response company for assisting the operator in coordinating the collective response to the event by the persons.

18. A method as set forth in claim 11, further including detecting, via one or more sensors, activity associated with the event occurring.

19. A method as set forth in claim 18, further including notifying, directly or indirectly through an intermediary device, the mobile devices of the detection of activity associated with the event occurring.

20. A method as set forth in claim 11, further including sending, via a wearable locator device configured to be worn by a target of the event response, information concerning at least one of a location, vector, and speed of the target.

21. A system as set forth in claim 1, wherein the portions of the information identified for sharing with the first and the second of the mobile devices by the server differs according to whether the persons using the first and second mobile devices have indicated, via the first and second mobile devices, whether each is engaged in the response to the event or monitoring the response to the event.

22. A system as set forth in claim 7, wherein the information selectively shared with the operator device by the server differs at least in part from the information selectively shared with the mobile devices by the server.

23. A system as set forth in claim 1, wherein the server is configured to establish a communication link directly between two or more of the mobile devices to facilitate independent communication between the two or more mobile devices.

24. A system as set forth in claim 7, wherein the server is configured to establish a communication link directly between one or more of the mobile devices and the operator device to facilitate independent communication between the one or more mobile devices and the operator device.

25. A system as set forth in claim 1, wherein the mobile application is configured to process the selectively shared information from the server to show, on the mobile devices, only that portion of the selectively shared information determined as most relevant to the persons using the mobile devices.

26. A system as set forth in claim 1, wherein the operator application is configured to process the selectively shared information from the server to show, on the operator device, only that portion of the selectively shared information determined as most relevant to the operator using the operator device.

27. A system as set forth in claim 7, wherein the mobile application and the operator application are configured such that the operator application displays more of the selectively shared information than the mobile application.

28. A system as set forth in claim 10, wherein the wearable locator device includes one of a watch, anklet, pendant, or animal collar configured for electronic communication with the server.

29. A system as set forth in claim 10, wherein the server is configured to instruct the wearable locator device to activate at least one of a visual alarm or audio alarm to facilitate locating the target wearing the wearable locator device.

30. A system as set forth in claim 7, further comprising at least one mobile asset in communication with the server, the at least one mobile asset configured to run one or both of the mobile application and operator application for on-site coordination and information sharing.

31. A system as set forth in claim 30, wherein the mobile asset includes one of a manned- or unmanned-vehicle and an unmanned aerial system.

\* \* \* \* \*